United States Patent [19]

Kuppens

[11] 4,003,647
[45] Jan. 18, 1977

[54] CLAW MECHANISM

[75] Inventor: Bernardus Johannes Kuppens, Eindhoven, Netherlands

[73] Assignee: U.S. Philips Corporation, New York, N.Y.

[22] Filed: Sept. 4, 1975

[21] Appl. No.: 610,327

[30] Foreign Application Priority Data

Sept. 10, 1974 Netherlands ............... 7411986

[52] U.S. Cl. .................. 352/194; 226/62; 226/70; 226/71
[51] Int. Cl.² ......................... G03B 1/22
[58] Field of Search ......... 352/191, 192, 193, 194, 352/195, 196; 226/62, 70, 71

[56] References Cited

UNITED STATES PATENTS

| 3,643,842 | 2/1972 | Maaden | 352/191 |
| 3,671,113 | 6/1972 | Johnson | 352/194 |
| 3,702,730 | 11/1972 | Russell | 352/191 |
| 3,797,924 | 3/1974 | Day | 352/191 |

Primary Examiner—Monroe H. Hayes
Attorney, Agent, or Firm—Frank R. Trifari; David R. Treacy

[57] ABSTRACT

A claw mechanism for the transport of a film in a film projector. A claw arm is disposed parallel to the transport path and pivotable about an axis transverse to the direction of transport; a claw means is disposed substantially transverse to the transport path, pivotally connected to the free end of the claw arm about an axis transverse to the direction of transport; and a drive shaft disposed parallel to said two axes, which rotates continuously during operation, comprises a crank which engages a slot in the claw means. A cam follower, pivotally connected to the free end of the claw arm about an axis parallel to the direction of transport, is pressed against one of two cams on the drive shaft by spring force and is connected to the electromagnetic control means for engagement alternatively with a first cam for keeping the film perforations out of engagement with the claw means, or a second cam for intermittently advancing the film by one frame per revolution to control the movements of the claw arm and thus the speed of film transport.

6 Claims, 1 Drawing Figure

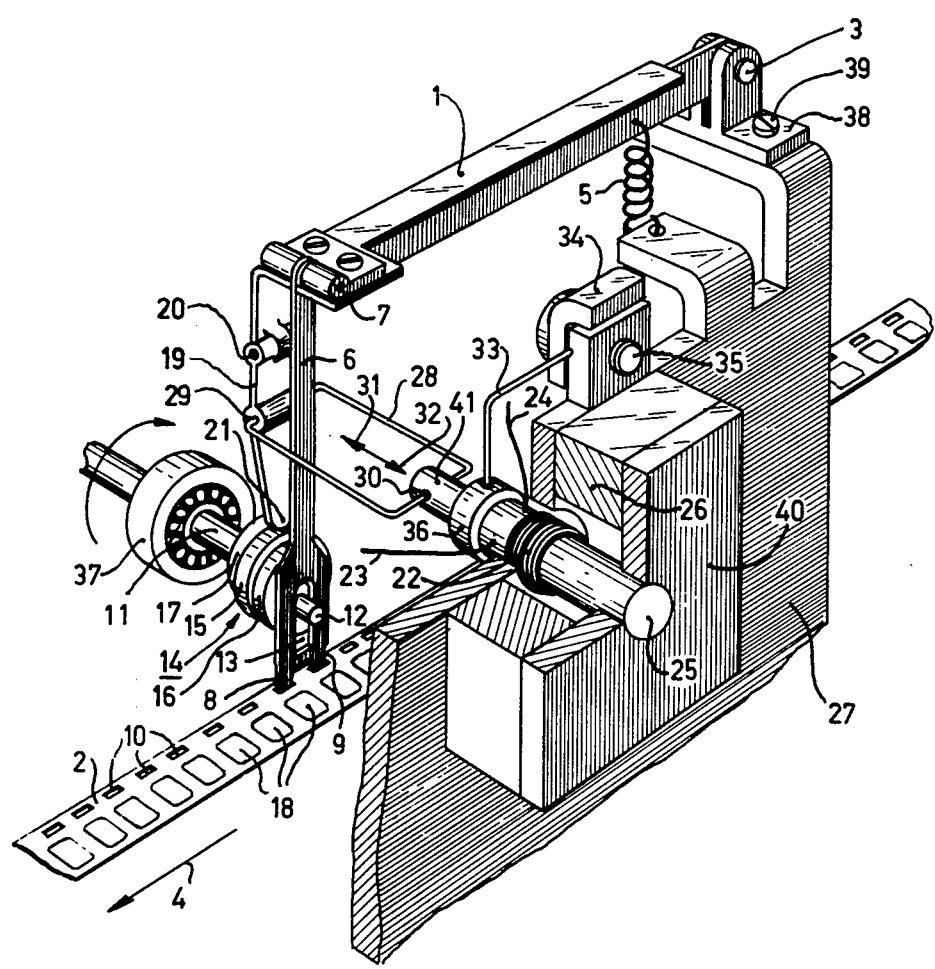

CLAW MECHANISM

The invention relates to a claw mechanism for the transport of a perforated record carrier, in particular a film in a film projector, along a transport path, and comprising a claw arm which is disposed substantially parallel to the transport path and which is pivotable about a pivoting spindle transverse to the direction of transport the record carrier, a spring which loads the claw arm in a direction towards the transport path, a claw means with one or more claw teeth which is connected to the free end of the claw arm and which extends substantially transversely to the transport path and pivotable about a spindle which is also transverse to the transport direction, a drive shaft which rotates continuously during operation and which is extended parallel to said two pivoting spindles, and a crank which co-operates with a slot in the claw means, as well as electromagnetic control means for controlling the movements of the claw arm and thus the speed of transport of the record carrier.

A claw mechanism of this type is known from Netherlands patent application No. 6,901,273, laid open for public inspection. In said known claw mechanism by means of which a film is advanced along a film path in a film projector, the electromagnetic means comprise an armature which is constituted by the claw arm itself. The eccentricity of the crank pin has been selected so that when the armature is not attracted, in which condition the film transport takes place, the crank pin brings the armature which is coupled to the claw means substantially into contact with a magnet core upon each revolution of the drive shaft. The magnet core comprises an electromagnet and a permanent magnet, which permanent magnet can attract the armature, i.e. the claw arm, against the spring force and can thus keep the claw teeth out of the film perforations. When the electromagnet which is disposed around the magnet core, is energized, a second magnetic field is produced, which counteracts the magnetic field of the permanent magnet, in such a way that the armature releases the core as a result of the tensile force of the spring.

Advantages of said known claw mechanism are that when the electromagnet is energized and the film is consequently advanced, the operation of the claw mechanism is substantially noiseless, in that the crank pin moves the claw teeth in a substantially elliptical closed path. Also when the electromagnet is not energized, the claw arm being drawn against the core of the magnet coil, the operation is very silent, because the crank pin exclusively imparts an oscillating movement to the claw means. However, if the electromagnet is periodically energized so as to obtain variations in the speed of transport, annoying noises will be produced. As during the periodic attraction of the claw arm against the magnet core and the subsequent release in spite of the fact that care has been taken that the claw arm is moved nearest to the magnet core by the crank pin, the claw arm must still be moved over a small distance by magnetic force, it cannot be prevented that said claw arm then strikes against the core with a certain speed. Another drawback of the known device is that the adjustment of the gap between the claw arm and the magnet core in the position in which the claw arm is nearest the magnet core, the adjustment of the position in the crank pin in the slot of the claw means and the adaptation of the permanent magnet to the spring force and the counterfield of the electromagnet, demand the necessary adjusting operations. A further important disadvantage is moreover that with the known claw mechanism no reverse film transport is possible, unless the direction in which the drive shaft is driven is reversed.

It is an object of the invention to provide a claw mechanism of the type mentioned in the preamble, which mitigates said drawbacks and the invention is characterized in that a cam roller, known per se, is disposed on the drive shaft, which roller comprises a first cam for keeping the claw means out of engagement with the perforations of the record carrier, and a second cam having a profile which is adapted to bring the claw means temporarily into engagement with the perforations for transport of the record carrier during each revolution of the drive shaft, the cam profiles coinciding over a part of their circumference, and that the claw mechanism further comprises a cam follower which is pivotable about a spindle parallel to the transport direction, and which is connected to the free end of the claw lever, which cam follower is pressed with its free end against the cam roller by the spring, as well as connection means which connect the cam follower to the electromagnetic control means and which impart the movements thereof to the cam follower.

In the claw mechanism according to the invention no transport of the record carrier takes place as long as the cam follower is situated on the first cam and transport in forward direction takes place when the cam follower is on the second cam. The cam follower is transferred from one cam to the other cam in the section where the cam profiles coincide. It is advantageous when the cam follower is connected to a return spring, which is in a neutral position in the case that the cam follower bears on the first cam and which in other cases loads the cam follower in a direction towards the first cam. For the movement of the cam follower from the first to the second cam the electromagnetic control means must be energized. However, said energization need not be continuous, it suffices when energization is effected only over a part of one revolution, because when the cam follower moves towards the transport path in accordance with the profile of the second cam, the free end of the cam follower will be situated below the profile surface of the first cam, so that also with disabled control the cam follower cannot return. However, said cam follower is automatically returned to the first cam by the return spring, and thus to its neutral position when there is no longer any difference in height between the two cams, i.e. when the two cam profiles coincide again. This feature of the claw mechanism according to the invention is of advantage, because it means that a control pulse need not be switched off with high accuracy at a specific instant. Neither is the instant of switching on very critical, because two cam profiles coincide over a certain part of their circumference.

An embodiment which has proved to perform satisfactorily in practice is characterized in that the electromagnetic control means comprise a movable electric coil as well as a soft-magnetic core disposed inside the coil, and a permanent magnet which surrounds the coil and the core. The return spring may then consist of a wire of an elastic material which co-operates with the coil.

When the claw mechanism is employed in a film projector simple and interaction-free framing of the picture is possible, if said first end of the claw arm is movable in said transport direction for framing purposes.

Said connection means between the cam follower and the control means may comprise a bracket which surrounds the claw means, which bracket is hinged to the cam follower at a location disposed between the two ends thereof, the brackets being movable in directions parallel to the drive shaft.

The invention will be described with reference to the drawing which schematically shows an embodiment of the invention.

In the drawing a claw arm is shown having the reference numeral 1, which arm extends substantially parallel to the transport path of a perforated film 2 and is pivotable about a pivoting spindle 3. Said spindle extends transversely to the direction of transport of the film 2, which direction is indicated in the drawing by means of an arrow 4, which points in the direction in which the film moves during forward projection. A tension spring 5 loads the arm 1 in a direction towards the film 2. A claw means 6 is pivotable about a spindle 7 which extends parallel to the spindle 3 and which is thus pivotably connected to the free end of the claw arm 1. The claw means comprises two claw teeth 8 and 9 at its end, which teeth during film transport co-operate with the perforations of the film 2. A drive shaft 11, which rotates continuously during operation, extends parallel to the pivoting spindles 3 and 7. A crank 12 which is driven by the drive shaft co-operates with a slot 13 of the claw means 6. On the drive shaft a cam roller 14 is disposed, which comprises a first cam 15, for keeping the claw means 6 out of engagement with the perforations 10, and further comprises two cams 16 and 17, of which the first cam has a profile which is adapted to advance the film 2 by one frame 18 every revolution of the drive shaft 11, and of which the other cam has a profile which is adapted to move the film one frame backwards per revolution. The cams 15 and 16 have such a profile that they coincide for a part of their circumference. A cam follower 19 is pivotable about a spindle 20 which extends parallel to the direction of transport of the film 2 and which is thus pivotably connected to the free end of the claw arm 1. The tension spring 5 presses the free end 21 of the cam follower 19 constantly against the cam roller 14. The cam follower 19 is connected to electromagnetic control means which comprise a movable electromagnetic coil 22, a coil leads 23 and 24, as well as a core 25 of a soft-magnetic material disposed inside the coil, and a permanent magnet 26 surrounding the coil and the core. These components are mounted on a frame plate 27 and a mounting plate 40. The connection between the cam follower 19 and the armature 25 is constituted by a metal-wire bracket 28 which surrounds the claw means 6 which bracket is pivotably connected to the cam follower 19 at 29 and which is pivotably connected to the coil 22 at 30. The bracket 28 can be moved by the coil 22 in the directions which are indicated in the drawing by the heads 31 and 32 of a double arrow. As the bracket 28 surrounds the claw means 6 and engages with the cam follower between its ends, a compact construction of the claw mechanism is realized, the distances to the various components being minimal and the transmission being as simple as possible. A return spring 33, which consists of a wire of an elastic material, which engages with the armature, which spring is connected to the frame with the aid of a clamping piece 34 and a bolt 35, is in the neutral position when the cam follower 19 engages with the cam 15. In the other cases the cam follower is loaded by the return spring in a direction towards the cam 15. When the coil 22 is not energized the end 21 of the cam follower consequently always bears on the neutral cam 15, so that there is no film transport neither in the forward nor in the reverse direction. The return spring 33 does not directly engage with the armature 25, but with the extended portion of a plastic coil former 36 which is rigidly connected to the coil, which coil former is provided with a pin 41 at its one end, in which a bracket 28 is pivotably journalled.

The operation of the claw mechanism is as follows. During operation the drive shaft 11, which is journalled in a ball bearing 37, rotates continuously so that the crank 12 continuously reciprocates in the slot 13. In the absence of a control pulse the situation is as shown in the drawing. The claw teeth 8 and 9 cannot engage with the perforations 10 of the film 2, because the cam follower 19 lifts the claw arm 1 too far for this purpose. When the coil 22 is energized continuously, for example with a voltage of such a polarity as to cause the coil to be moved in the direction 32, the end 21 will engage with the cam 16 and film transport is effected in a forward direction at the maximum speed. Reverse projection with the maximum speed is effected when the coil is continuously energized with a voltage of opposite polarity. If forward or reverse projection with a speed lower than the maximum speed is desired, the coil 22 is not energized continuously but voltage pulses are applied to it. Said pulses start at the instant that the end 21 of the cam follower is substantially at the location of the point where the cams have coincident cam profiles. The voltage pulse is sustained during a part of a single revolution of the drive shaft and is then terminated. The cam follower 19 cannot directly return to the neutral cam 15, because the end 21 is pressed against the side of the cam 15 by the return spring 33. At the instant that the cam profiles coincide again the return spring returns the cam follower 19 to its neutral position. Thus, by applying a voltage pulse once every two rotations of the drive shaft 11, the speed of transport can be halved, whilst of course a further reduction of the forward or reverse speed is also possible.

Not shown in the drawing, but readily realizable by those skilled in the art, is a framing device for framing, i.e. adjusting the height of a frame which is projected on a screen, the chassis 27 together with the components on it shown in the drawing, being bodily movable parallel to the transport path with the aid of suitable means. Suitable means might for example be constituted by a nut which is rigidly connected to the frame, a threaded rod which co-operates with the nut and a guide for the frame. The movement of the frame means an equal movement of the hinge base 38, which is connected to the frame 27 by screws 39 and which carries the pivoting spindle for the claw arm. Such a framing has no effect on the correct operation of the transport mechanism, although it is evident that when the frame 27 is moved the end 21 of the cam follower 19 is also moved so that the position of the claw teeth 8 and 9 changes. However, in practice said movements and variations are so small that they do not give rise to any adverse effects.

What is claimed is:

1. A claw mechanism for the transport of a perforated record carrier, in particular a film (2) in a film projector, along a transport path, and comprising:
- a claw arm (1) which is disposed substantially parallel to the transport path and which is pivotable about a pivoting spindle (3) transverse to the direction of transport of the record carrier,
- a spring (5) which loads the claw arm in a direction towards the transport path,
- a claw means (6) having one or more claw teeth, which means extends substantially transversely to the transport path and which is connected to the free end of the claw arm (1) and is pivotable about a spindle (7) which is also transverse to the direction of transport,
- a drive shaft (11) which is disposed parallel to said two pivoting spindles (3, 7) and which rotates continuously during operation, and a crank (12) which cooperates with a slot (13) in the claw means (6), as well as
- electromagnetic control means for controlling the movements of the claw arm and thus the speed of transport of the record carrier, characterized in that:
- a cam roller (14), is disposed on the drive shaft, which roller comprises a first cam (15) for keeping the claw means out of engagement with the perforations of the record carrier, and a second cam (16) with a profile which is adapted for temporarily bringing the claw means (6) into engagement with the perforations (10) per revolution of the drive shaft (11) for advancing the record carrier (2), the cam profiles coinciding for a part of their circumference, and the claw mechanism furthermore comprises:
- a cam follower (19) which is connected to the free end of the claw arm (1) so as to be pivotable about a spindle (20) parallel to the direction of transport (4), which cam follower is pressed against the cam roller (14) with its free end (21) by the spring (5), as well as
- connection means, which connect the cam follower to the electromagnetic control means and which transmit the movements thereof to the cam follower.

2. A claw mechanism as claimed in claim 1, characterized in that the cam follower (19) is connected to a return spring (33) which is in a neutral position in the case that the cam follower engages with the first cam (15) and which in other cases loads the cam follower in a direction towards the first cam.

3. A claw mechanism as claimed in claim 1, characterized in that the electromagnetic control means comprise:
- a movable electric coil (22),
- a core (25) of a soft-magnetic material which is disposed inside the coil, and
- a permanent magnet (26) which surrounds the coil (22) and the core (25).

4. A claw mechanism as claimed in claim 3, characterized in that the cam follower (19) is connected to a return spring (33) which is in a neutral position in the case that the cam follower engages with the first cam (15) and which in other cases loads the cam follower in a direction towards the first cam, and the return spring (33) consists of a wire of an elastic material which cooperates with the movable coil (22).

5. A claw mechanism as claimed in claim 1, characterized in that the first end of the claw arm is movable in said transport direction for framing purposes.

6. A claw mechanism as claimed in claim 1, characterized in that said connection means comprise a bracket (28) which is disposed around the claw means (6), which bracket is pivoted to the cam follower (19) at a location (29) which is situated between the two ends thereof, the bracket being movable in directions (31–32) parallel to the drive shaft (11).

* * * * *